(12) United States Patent
Glover et al.

(10) Patent No.: US 6,557,598 B2
(45) Date of Patent: May 6, 2003

(54) WILDLIFE AND FISH FEEDER

(76) Inventors: Nolan S. Glover, 720 Village Bend Rd., Mineral Wells, TX (US) 76067; Dan Cloud, 2310 Del Prado, Granbury, TX (US) 78048

(*) Notice: Subject to any disclaimer, the term of this patent is extended or adjusted under 35 U.S.C. 154(b) by 74 days.

(21) Appl. No.: 09/879,374

(22) Filed: Jun. 11, 2001

(65) Prior Publication Data

US 2002/0185075 A1 Dec. 12, 2002

(51) Int. Cl.[7] .................................................. B65B 1/04
(52) U.S. Cl. ............................ 141/387; 141/2; 141/18; 141/67; 406/146; 406/122
(58) Field of Search ................................. 406/146, 122, 406/64; 141/67, 18, 2, 387

(56) References Cited

U.S. PATENT DOCUMENTS

| | | | |
|---|---|---|---|
| 1,556,718 A | 10/1925 | Ronning et al. | |
| 1,844,065 A | 2/1932 | Heintz et al. | |
| 2,701,179 A | * 2/1955 | McKinney | 423/74 |
| 2,821,439 A | * 1/1958 | Spies, Jr. et al. | 406/34 |
| 2,970,532 A | 2/1961 | Skelton | 99/235 |
| 3,195,508 A | 7/1965 | Lehman et al. | 119/51.11 |
| 4,583,883 A | 4/1986 | Johanning | 406/65 |
| 4,846,608 A | 7/1989 | Sanders | 406/144 |
| 5,209,608 A | 5/1993 | Edwards | 406/100 |
| 5,350,257 A | 9/1994 | Newbolt et al. | 406/75 |
| 5,862,777 A | 1/1999 | Sweeney | 119/57.91 |

* cited by examiner

Primary Examiner—Steven O. Douglas
(74) Attorney, Agent, or Firm—Charles D. Gunter, Jr.

(57) ABSTRACT

A device is shown for filling a wildlife feeder with material. The device has a primary conduit and a pressure source connected to the primary conduit for propelling air through the primary conduit. A secondary conduit extends from the primary conduit such that at least a portion of the air flowing though the primary conduit flows through the secondary conduit and into a primary receptacle wherein a pressure is created inside the primary receptacle that is equal to or greater than the pressure in the primary conduit. The primary receptacle has a sealable feed port for receiving material to be conveyed and an outlet connected to the primary conduit down stream from the pressure source and the secondary conduit such that material can pass from the primary receptacle by gravity flow through the outlet and become entrained in the movement of the air created by the pressure source and into a secondary receptacle which is located at an elevated location.

20 Claims, 4 Drawing Sheets

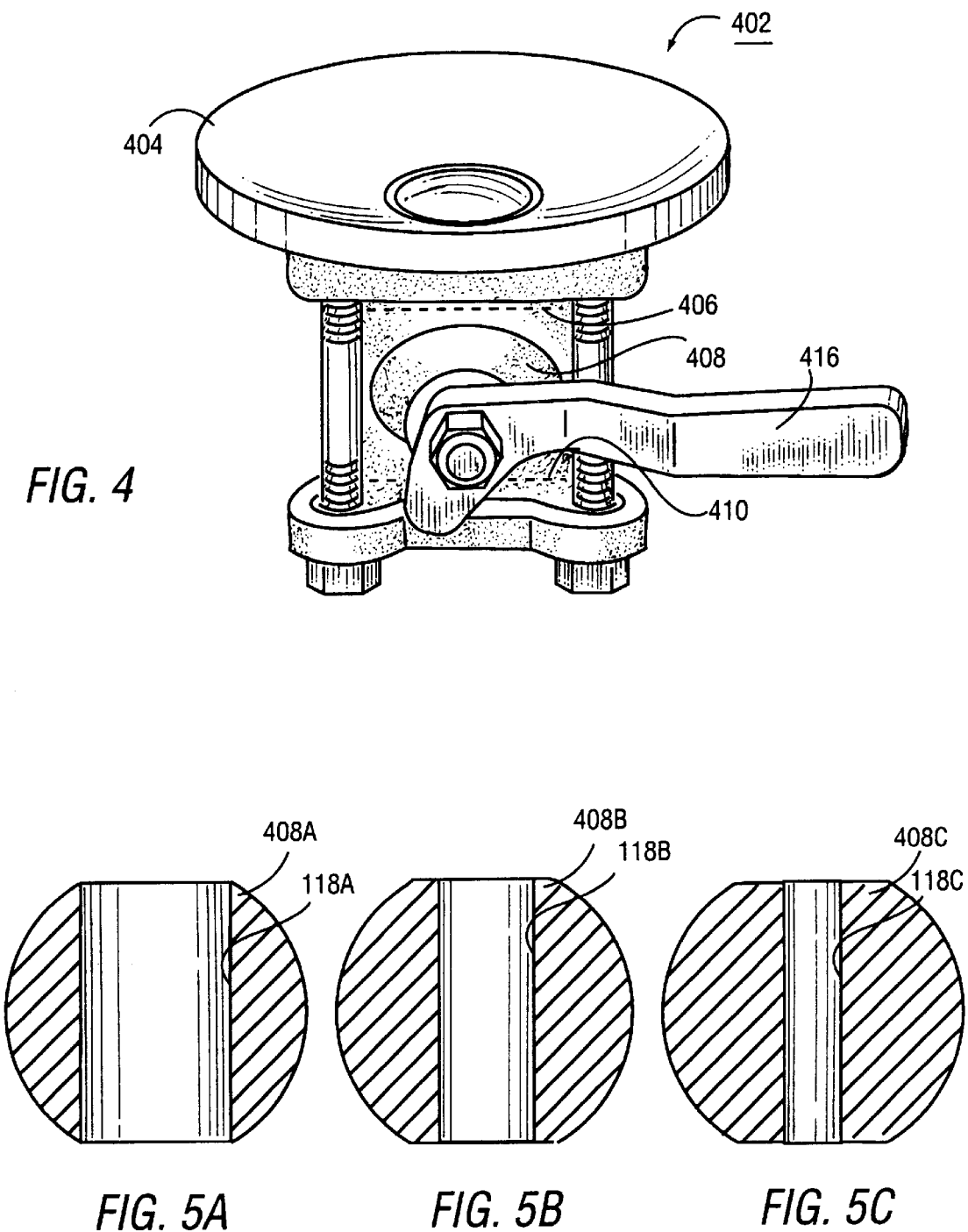

WILDLIFE AND FISH FEEDER

BACKGROUND OF THE INVENTION

1. Technical Field

The present invention relates generally to wildlife and fish feeders and, particularly, to a method and apparatus for filling a wildlife and fish feeder.

2. Description of the Related Art

Wildlife and fish feeders are used in the conservation and management of various types of wildlife from deer, elk and exotic animals, to many kinds of birds including turkey, quail, pheasant, as well as various fish and shrimp. Some feeders are used to attract wildlife into a backyard or similar area for viewing. Other wildlife feeders, like a deer feeder, (deer are used as an example herein, but the concepts applicable to deer also apply to other wild animals, such as turkey, wild hogs, elk and the like) are to supplement the deer's food source. Often, harsh weather or other environmental conditions cause a shortage in the deer's food supply. Shortage of food can cause the deer to move to a different territory or, where that is not possible, the shortage can result in a malnourished deer population. A malnourished deer population is undesirable for various reasons, but is especially troublesome in areas where the deer are hunted.

Wildlife feeders are typically left unattended and dispense feed one or more times per day at exact predetermined intervals. Depending on the capacity of the feeder and amount of food dispensed each day, most operate unattended without refilling for a month or more. Typical sizes range from the smallest 80 lb. capacity unit to the largest that can hold 1,000 lbs. of feed. Some protein feeders will hold from 1,000 to 3,000 lbs. of particulate material. One of the most popular feeders is made to hold 300 lbs. of corn.

One form of container for a wildlife feeder of the type under consideration is made of a 55 gallon steel drum with a funnel shaped dispensing end and an oppositely arranged cover used to keep out rain and debris. A motor and spinner combination or other dispensing mechanism is used on most feeders to dispense the feed at timed intervals. Feeders are generally supported at an elevated location in order to prevent raccoons and squirrels and other wildlife from reaching the spinner and emptying the feeder. Also, the dispensing means must be kept out of reach of the deer which are intended to be fed because otherwise the deer could eat food directly from the feeder, thereby finishing the feed prematurely.

In order to support the dispensing means at an elevated location, the feeders are sometimes suspended from trees. Alternatively, a three leg tepee-like structure is formed in which the tops of the legs come together at a point with the feeder being supported either above or below this point. Because the feeder is supported at an elevated location, it is often dangerous and exhausting to fill. Typically, the refilling operation requires a person to climb a 12 to 15 foot ladder carrying a 50 pound bag of feed. It is usually then necessary to turn loose of the ladder with both hands in order to dump the bag of feed into the container. A 55 gallon drum feeder requires at least 6 trips up and down the ladder plus two more trips up and down the ladder to remove and replace the cover. Also, deer feeders are often used in far away and/or hard-to-reach places that have no source of power and are not easily accessible with a vehicle.

A need exists for an apparatus for filling a wildlife and fish feeder that can be operated from ground level. The apparatus must be simple to operate, be portable and be relatively inexpensive in design and manufacture. Also, the feeder must be able to fill a container with different types of particulate material such as corn, grain or protein powder.

BRIEF SUMMARY OF THE INVENTION

It is an object of the present invention to provide a wildlife and fish feeder that can be operated from ground level.

It is another object of the present invention to provide a wildlife and fish feeder that is simple to operate and which is portable.

It is yet another object of the present invention to provide a wildlife and fish feeder that can fill a container with different types of particulate material ranging in size from grain or corn to protein powder.

The above objects are achieved by providing a device for filling a wildlife feeder with granular, cylindrical, or flake material wherein the device comprises a primary receptacle for receiving a particulate material to be dispensed having associated therewith a primary conduit and an impeller source connected to the primary conduit to impel air. The movement of the air created by the impeller source can travel relatively unobstructed through the primary conduit. A secondary conduit extends from the primary conduit such that at least a portion of the air flowing though the primary conduit flows through the secondary conduit and into the primary receptacle, wherein a pressure is created inside the primary receptacle that is equal to or greater than the pressure in the primary conduit. The primary receptacle has a sealable feed port for inserting particulate material into the primary receptacle and an outlet connected to the primary conduit down stream from the impeller source and the secondary conduit. In this way, material can pass from the primary receptacle, through the outlet and become entrained in the movement of the air created by the impeller source so that the material can be transported pneumatically into a secondary receptacle which is located at an elevated position relative to the primary receptacle. The secondary receptacle is equipped with a dispensing mechanism, such as a motor-spinner combination, for dispensing the particulate material at time intervals.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

FIG. 4 is an isolated view of the flow valve which is used to dispense material from the primary receptacle;

FIGS. 5A–5C are side, cross-sectional views of three balls which can be substituted within the flow valve of FIG. 4 in order to dispense particulate materials of various sizes and shapes.

DETAILED DESCRIPTION OF THE PREFERRED EMBODIMENT

Figure 1:
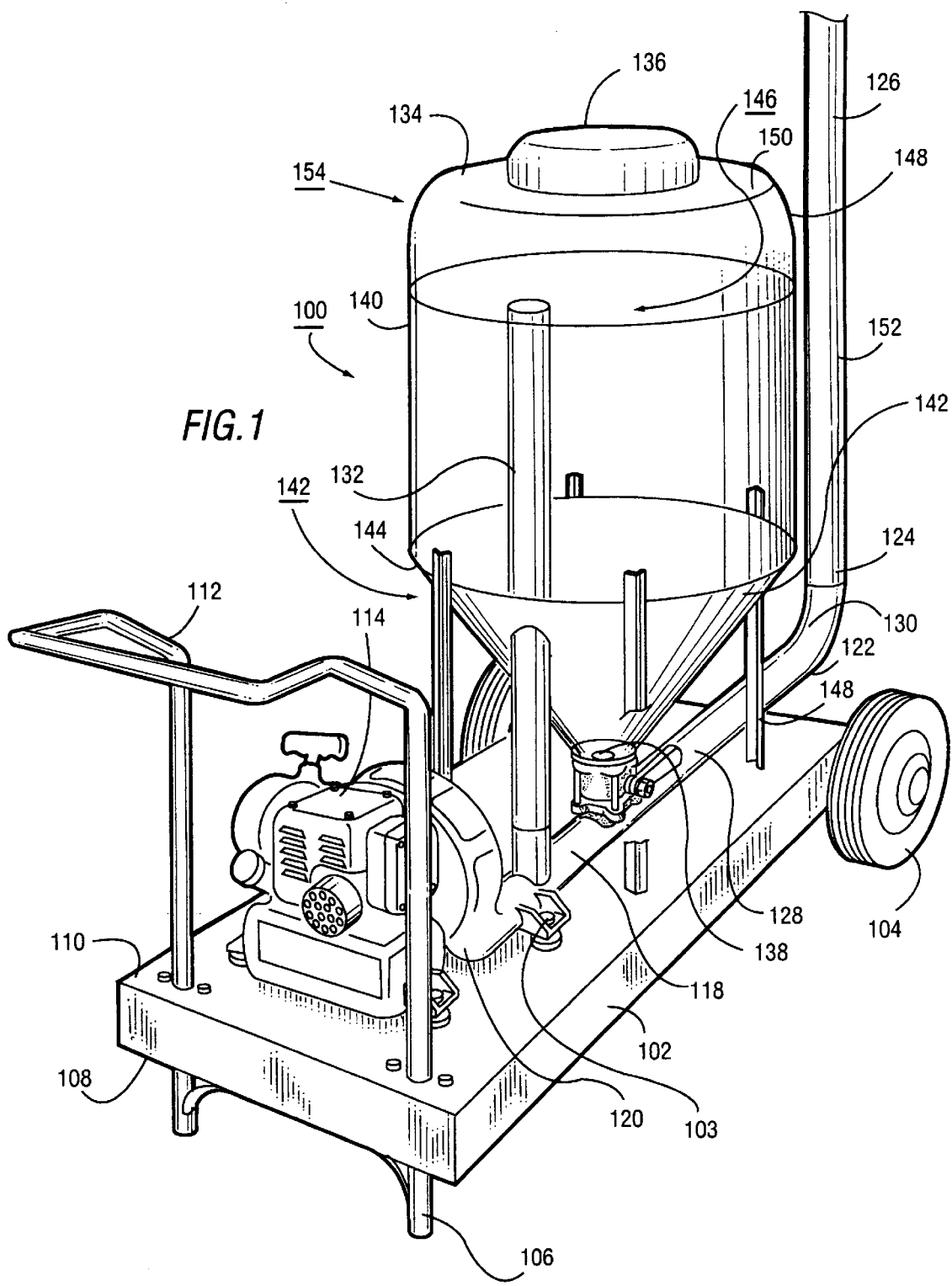
FIG. 1 is a perspective view of the primary receptacle of the wildlife feeder of the present invention with portions being shown broken away for ease of illustration.

FIG. 1 of the drawings shows a filler device for filling a receptacle forming a portion of a wildlife feeder with granular, cylindrical or flake material, the device being designated generally as 100. The filler device 100 is used to fill the secondary receptacle 304 (FIGS. 2 and 3) of the wildlife feeder. The device 100 includes a portable base 102 having a top planar surface 110 and a bottom planar surface 108 for transport to and from the vicinity of the secondary receptacle 304. The base 102 may be made of any material such as wood, metal or plastic that is sufficiently strong to support the entire apparatus and is able to withstand use in remote locations. The base 102 has two wheels 104 at a rearward extent and support members 106 at a forward extent. The wheels 104 are of sufficient diameter as to easily roll over rough terrain and are preferably tubeless rubber tires. The support members 106 may be fixedly attached to the bottom side 108 of the base 102 and are long enough to provide a relatively level base 102 when the filler 100 is at rest. A handle 112 is attached to the top planar surface 110 of the base 102 opposite the wheels 104 such that a user can use the handle 112 to push, pull, and steer the filler 100. The handle 112 may be made of metal, plastic or other suitable material. The filler 100 could also be provided with only one wheel 104 and resemble a wheelbarrow or may have a plurality of wheels 104. Alternatively, the filler may be mounted on a stationary base.

The top planar surface 110 of portable base 102 has mounted thereon a blower 114. Blower 114 can be any motorized pressure source for propelling air typically at about at least 200 cfm but preferably around 385 cfm. Preferably, blower 114 has a gas powered engine but could be electric, or even battery powered. Gas or battery power would allow the filler 100 to be used in remote locations. However, if the filler 100 was going to be used close to an electrical source, then the unit may simply be plugged into the power source. The blower 114 used in the present embodiment is a standard gas powered leaf blower. The blower 114 is fixedly attached to the base 102 by suitable fastening means such as bolts 103.

The blower 114 is connected to a primary conduit 118 having a generally horizontal section 128 with a first end 120 and a second end 122. The primary conduit also includes a generally vertical section 152 having a top end 126 and a bottom end 124 wherein the bottom end 124 is connected to the second end 122 of the horizontal section 128 by an elbow 130. A U-shaped extent 202 (FIGS. 2 and 3) is connected to the top end 126 of the vertical section 122 of the primary conduit 118. The blower 114 is attached to the first end 120 of the horizontal section 128 such that air can travel relatively unobstructed through the entire length of the primary conduit 118. The primary conduit 118 is preferably made out of plastic such as PVC. In the preferred embodiment illustrated, the primary conduit 118 has an inside diameter of 1–5 inches but preferably has an inside diameter of 3 inches. The elbow 130 is preferably rigid but can be an adjustable elbow, swivel joint, accordion joint or other type of flexible tubing. Preferably, the vertical section 152 is adjustable so as to be able to adjust to the various possible heights of the secondary receptacle 304. For example, the vertical section 152 may include a slide tube 314 (FIG. 3) as the means for adjusting the height. The vertical section 152 may also have a quick disconnect 316 or some other similar device for quickly and easily reducing the storage length of the vertical section 152 of the primary conduit 118.

Figure 2:
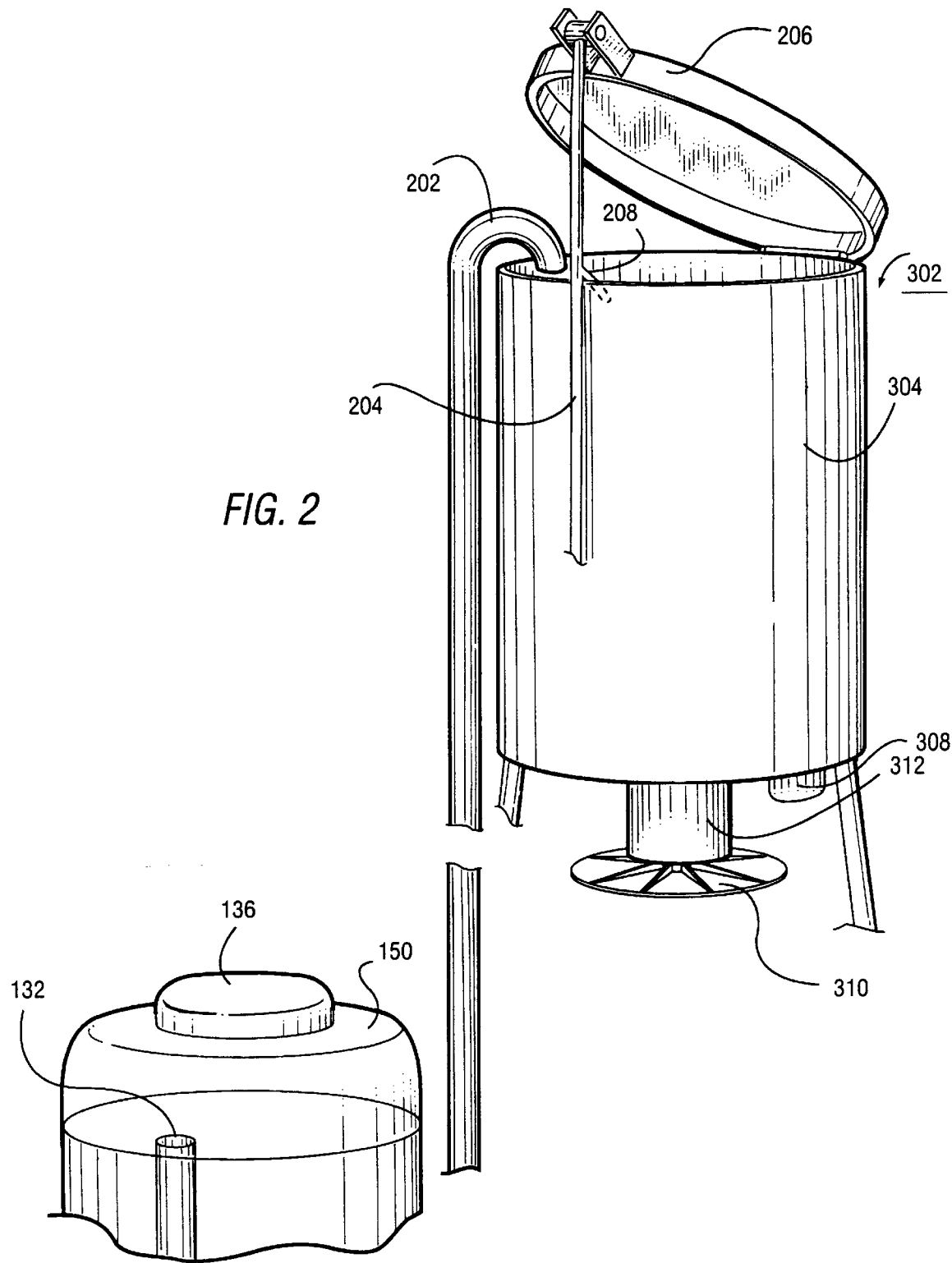
FIG. 2 is an isolated view showing a portion of the primary receptacle and primary conduit being used to supply material to the secondary receptacle.

With reference to FIG. 2, feeder 302 also includes a secondary receptacle 304 supported by legs 306. A spout 308 is located on the bottom of the secondary receptacle 304 and is connected to a dispensing mechanism 310. The dispensing mechanism 310 is provided for intermittently propelling the feed from spout 308 away from the secondary receptacle 304 and onto the ground. Dispensing mechanism 310 has a housing 312 connected to the secondary receptacle 304. Inside housing 312 is a motor, power supply (usually a battery), and programming means (these three elements are not shown but are well known in the art). The motor is connected to the dispensing mechanism 310 and at various pre-selected times throughout the day, the programming means and power means cause the motor to turn quickly thus activating the dispensing mechanism 310 and propelling a pre-determined amount of feed away from the secondary receptacle 304.

The legs 306 are sufficiently long to maintain the secondary receptacle 304 and the dispensing mechanism 310 out of the reach of the wildlife. The dispensing mechanism 310 must be kept out of reach because otherwise the wildlife could eat directly from the spout 308 and finish the feed prematurely. The legs 306 are angled outwardly from the feeder 302, thereby keeping the feeder 302 balanced.

Figure 3:
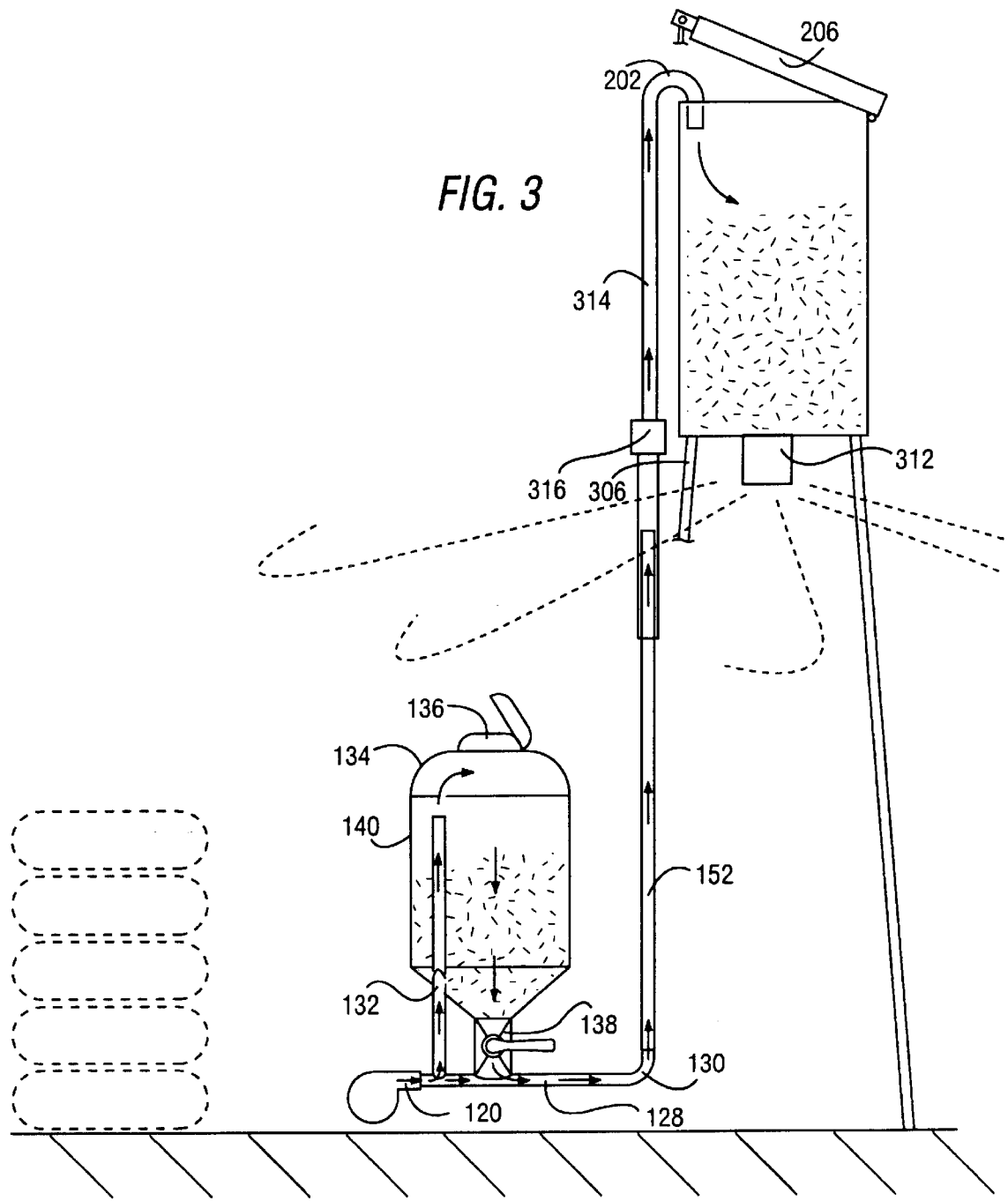
FIG. 3 is a simplified, partially schematic view of the wildlife feeder of the invention showing material being conveyed from the primary receptacle to the secondary receptacle.

FIG. 3 shows the top end 126 of the vertical section 152 including the U-shaped extent 202. The U-shaped extent 202 is for directing the material into the secondary receptacle of the feeder and can have any general shape or angle that would allow the material to be directed into the secondary receptacle. Preferably, the U-shaped extent 202 bends in the range of about 90°–180° relative to the center axis of the vertical section 152. The diameter of the U-shaped extent 202 is generally the same diameter as the primary conduit 118.

Returning to FIG. 1, a secondary conduit 132 is in communication with and extends generally perpendicular from the primary conduit 118 downstream of the blower 114. In the embodiment illustrated, the secondary conduit 132 has an inside diameter of up to about 3 inches, and most preferably has an inside diameter in the range of ¼–½ inches. The secondary conduit 132 can be made out of any material but is preferably made of PVC pipe or the same material as primary conduit 118. The secondary conduit 132 extends from the primary conduit 118 such that at least a portion of the air flowing though the primary conduit 118 flows through the secondary conduit 132 and into a primary receptacle 134 wherein a pressure is created inside the primary receptacle 134 that is equal to or greater than the pressure in the primary conduit 118.

The primary receptacle 134 has a sealable feed port 136 for receiving material to be conveyed and an outlet 138 which communicates with the primary conduit 118 down stream from the blower 114 and the secondary conduit 132. In this way, material can pass from the primary receptacle 134, through the outlet 138 and become entrained in the primary conduit 118 by the movement of the air created from the blower 114, whereby the material is transported into the secondary receptacle 304. The primary receptacle 134 is made up of a top portion 154 having generally cylindrical shaped side walls 140 which is joined to a bottom portion 142 having funnel shaped walls 144 which converge to form the outlet 138. The cylindrical shaped side walls 140 and the funnel shaped walls 144 combine to form the receptacle walls 148 which define an initially open interior 146. The primary receptacle 134 can preferably hold 30 gallons of feed in the open interior 146 but may hold any amount depending on the desired size of the primary receptacle 134 and filler 100. A smaller more portable filler 100 would have a smaller primary receptacle 134. If size and portability are not an issue, then a much larger primary receptacle 134 may be used. The sealable feed port 136 should be large enough so the feed or material is easily poured into the primary receptacle 134 and is preferably located on the upper most section 150 of the top portion 154 of the primary receptacle 134 but may be located anywhere that allows for filling of the primary receptacle 134.

The primary receptacle 134 may be supported by support members 148 fixedly attached to the primary receptacle 134 by spot welding, anchor bolts, a friction fit, or may be slightly spaced apart from the primary receptacle 134 so long as the support members 148 prevent the primary receptacle 134 from tipping. The support members 148 are securely anchored to the base by spot welding, anchor bolts, or some other type of attachment means such that they can support the leaning weight of a full primary receptacle 134 and prevent it from tipping.

The secondary conduit 132 preferably enters the primary receptacle 134 at the bottom funnel shaped portion 142 and extends into the open interior 146 generally to within a few inches of the upper most section 150 of the top portion 154 so as to avoid becoming plugged or clogged with feed or material. In the embodiment of the invention illustrated in FIG. 1, the secondary conduit 132 presents a vertical profile within the open interior 146 of the primary receptacle 134 and is generally parallel to the vertical section 152 of the primary conduit 118. Typically, any feed or material that falls into the secondary conduit 132 will be pushed back out by the air flowing in the secondary conduit 132. The purpose of the secondary conduit 132 is to create pressure inside the primary receptacle 134 that is greater than or equal to the pressure in the primary conduit 118. If the pressure inside the primary receptacle 134 is greater than or equal to the pressure in the primary conduit 118, then feed or material can be dispensed from the primary receptacle 134 and conveyed by the primary conduit through the horizontal leg 118 and upward through the vertical leg 124.

The outlet 138 of the primary receptacle 134 is provided with a flow control means such as on-off valve 402 (FIG. 4). The valve 402 contains amounting flange or feeder bowl 404, an intake seal 406, a ball valve 408 and a discharge seal 410. Intake seal 406 and discharge seal 410 (shown in dotted lines in FIG. 4) surround ball valve 408 such that ball valve 408 is rotatively interposed in a particle free seal. A handle 416 may be attached to ball valve 408 to rotate ball valve 408 from an open position to a closed position to start and stop the flow of material. As shown in FIGS. 5A–5C, the ball valve 408 has a bore 418 of a desired diameter for the flow of particulate material through the ball valve 408. The ball valves 5A–5C can be interchanged to vary the diameter of the bore 418 depending on the type of material being transported and the desired flow rate.

While the flow control means has been illustrated as a ball valve in the above description, those skilled in the art will appreciate that other on-off valves with interchangeable orifice sizes could be utilized as well. For example, a plaster slice type gate valve with drop-in orifice plates could also be utilized.

Returning to FIG. 1, the outlet 138 of the primary receptacle dispenses material by gravity flow into the primary conduit 118 where it is entrained in the air flow proceeding towards the elbow 130. The distances at which the elbow 130 is located relative to the outlet 138 and the primary receptacle 134 is not critical but is preferably within about 5 feet from the outlet 138 and/or primary receptacle 134. The angle of the elbow 130 is also not critical but is preferably around a 90° angle. The entrained material within the primary conduit 128 continues past the elbow 130 and up the vertical section 152 to the U-shaped extent 202 where it is expelled from the U-shaped extent 202 into the secondary receptacle 304. The operator will generally know the secondary receptacle 304 is full when a predetermined number of bags have been used, when the material starts to back up at the U-shaped extent 202, or when material can be seen near the top of the secondary receptacle 304.

As shown in FIG. 2, the feeder 302 may be equipped with a lifting rod 204. Lifting rod 204 is connected to feeder cover 206 and may have an extent 208 that protrudes from the lifting rod 204 at an angle relative to the central axis of the lifting rod 204. The extent 208 is sufficiently rigid to support the entire weight of the feeder cover 206 when positioned on the lip of the secondary receptacle 304 as shown in FIG. 2. The lifting rod may be permanently attached to the feeder cover 206 or it may be carried with the filler 100 and inserted into a groove or slot in the feeder cover 206 so the user can lift the feeder cover 206 from the ground and does not have to climb a ladder to gain access to the secondary receptacle for filling purposes.

An invention has been provided with several advantages. In the past, a feeder such as feeder 302 was often difficult and dangerous to fill. The present filler device provides a safe and convenient means for transporting particulate material from a horizontal location to the elevated vertical position of the feeder. In addition, the feeder 302 is often used in far away and/or hard-to-reach places that have no source of power and are not easily accessible with a vehicle. The present invention is able to operate on gas or electric power, is portable, and can fill feeder 302 from the ground level with different types of particulate material ranging from corn to protein powder. The present invention can be operated without high pressures and can operate at air pressures much lower than the 15 psig pressures typically found in high pressure systems.

It should be understood that various alternatives to the embodiments of the invention described herein may be employed in practicing the invention. For example the primary receptacle 134 and all the parts generally on or around the base 102 may be attached to a trailer, the bed of a truck, or on the deck of a boat. It is intended that the following claims define the scope of the invention and that structures and methods within the scope of these claims and their equivalents be covered thereby.

What is claimed is:

1. A device for filling a wildlife feeder with granular, cylindrical, or flake material, the device comprising:

a primary receptacle for receiving material to be dispensed, the primary receptacle being located at a first vertical location;

a primary conduit;

a pressure source connected to the primary conduit for propelling air through the primary conduit, the pressure source being so located that air can travel relatively unobstructed through the primary conduit;

a secondary conduit in communication with and extending from the primary conduit such that at least a portion of the air flowing though the primary conduit flows through the secondary conduit and into the primary receptacle wherein a pressure is created inside the primary receptacle that is equal to or greater than the pressure in the primary conduit;

the primary receptacle having a sealable feed port for receiving material to be conveyed and an outlet connected to the primary conduit down stream from the pressure source and the secondary conduit such that material can pass from the primary receptacle by gravity feed through the outlet and become entrained in the movement of the air created by the pressure source and into a secondary receptacle, the secondary receptacle being located at a second vertical location which is elevated relative to the first vertical location.

2. The device of claim 1 wherein the primary receptacle and pressure source are mounted on a portable base for transport to and from a wildlife feeder.

3. The device of claim 2 wherein the source to impel air is connected to the primary conduit at the first end of the horizontal section.

4. The device of claim 2 wherein the portable base further comprises a platform having at least one wheel wherein the primary receptacle is fixedly attached to the platform.

5. The pneumatic conveyor of claim 1 wherein the primary conduit comprises:
   a generally horizontal section having a first end and a second end;
   a generally vertical section having a top end and a bottom end wherein the bottom end is connected to the second end of the horizontal section by an elbow; and
   a U-shaped extent connected to the top end of the vertical section.

6. The device of claim 1 wherein the secondary receptacle is located at a vertical elevation above the primary receptacle.

7. The device of claim 1 wherein the pressure source is a blower.

8. The device of claim 1 wherein the primary receptacle comprises:
   a top portion having generally cylindrical shaped side walls;
   a bottom portion having funnel shaped walls which converge to form an outlet;
   an initially open interior defined by the receptacle walls; and
   wherein the sealable feed port for inserting material into the initially open interior is a cap located on the top portion of the primary receptacle.

9. The device of claim 1 wherein the secondary conduit extends generally perpendicularly from the primary conduit and passes through the receptacle walls and into the initially open interior of the primary receptacle.

10. The device of claim 1 wherein the outlet communicates with the primary conduit by means of a ball valve, the ball valve including:
    a feeder bowl attached to the outlet of the primary receptacle;
    a interchangeable ball located within the feeder bowl, the ball having an bore therein for controlling the flow of material from the container to the primary conduit.

11. The device of claim 1 wherein the vertical section is adjustable to the vertical height of the secondary receptacle.

12. A method of filling a wildlife and fish feeder comprising the steps of:
    transporting a device for filling the wildlife and fish feeder, the device comprising:
    a primary conduit;
    a pressure source connected to the primary conduit for propelling air through the primary conduit, the pressure source being so located that air can travel relatively unobstructed through the primary conduit;
    a secondary conduit in communication with and extending from the primary conduit such that at least a portion of the air flowing though the primary conduit flows through the secondary conduit and into a primary receptacle wherein a pressure is created inside the primary receptacle that is equal to or greater than the pressure in the primary conduit;
    the primary receptacle having a sealable feed port for receiving material to be conveyed and an outlet connected to the primary conduit down stream from the pressure source and the secondary conduit such that material can pass from the primary receptacle by gravity feed through the outlet and become entrained in the movement of the air created by the pressure source and into a secondary receptacle;
    filling the primary receptacle with material;
    raising the lid on the secondary receptacle;
    positioning the primary conduit such that the material can enter the secondary receptacle;
    activating the pressure source to propel air through the primary conduit wherein the material may become entrained in the movement of the air created by the pressure source and into a secondary receptacle.

13. The method of claim 12 wherein the primary receptacle and pressure source are mounted on a portable base for transport to and from a wildlife feeder.

14. The method of claim 12 wherein the primary conduit comprises:
    a generally horizontal section having a first end and a second end;
    a generally vertical section having a top end and a bottom end wherein the bottom end is connected to the second end of the horizontal section by an elbow; and
    a U-shaped extent connected to the top end of the vertical section.

15. The method of claim 12 wherein the source to impel air is connected to the primary conduit at the first end of the horizontal section.

16. The method of claim 12 wherein the secondary conduit passes through the receptacle walls and into the initially open interior of the primary receptacle.

17. The method of claim 12 wherein the outlet communicates with the primary conduit by means of a ball valve, the ball valve including:
    a feeder bowl attached to the outlet of the primary receptacle;
    a interchangeable ball located within the feeder bowl, the ball having a bore therein for controlling the flow of material from the container to the primary conduit.

18. The method of claim 12 wherein the vertical section is adjustable to the vertical height of the secondary receptacle.

19. The method of claim 12 wherein the means for raising the lid on the secondary receptacle is a lifting rod inserted into a groove or slot in the feeder cover.

20. The method of claim 19 wherein the lifting rod has an extent that protrudes from the lifting rod at an angle relative to the central axis of the lifting rod and is sufficiently rigid to support the entire weight of the feeder cover when positioned on the lip of the secondary receptacle.

* * * * *